June 27, 1967     D. S. CHISHOLM     3,328,003
METHOD AND APPARATUS FOR THE GENERATION OF A PLURALITY
OF LAYERS IN A FLOWING STREAM
Filed Feb. 9, 1965     2 Sheets-Sheet 1
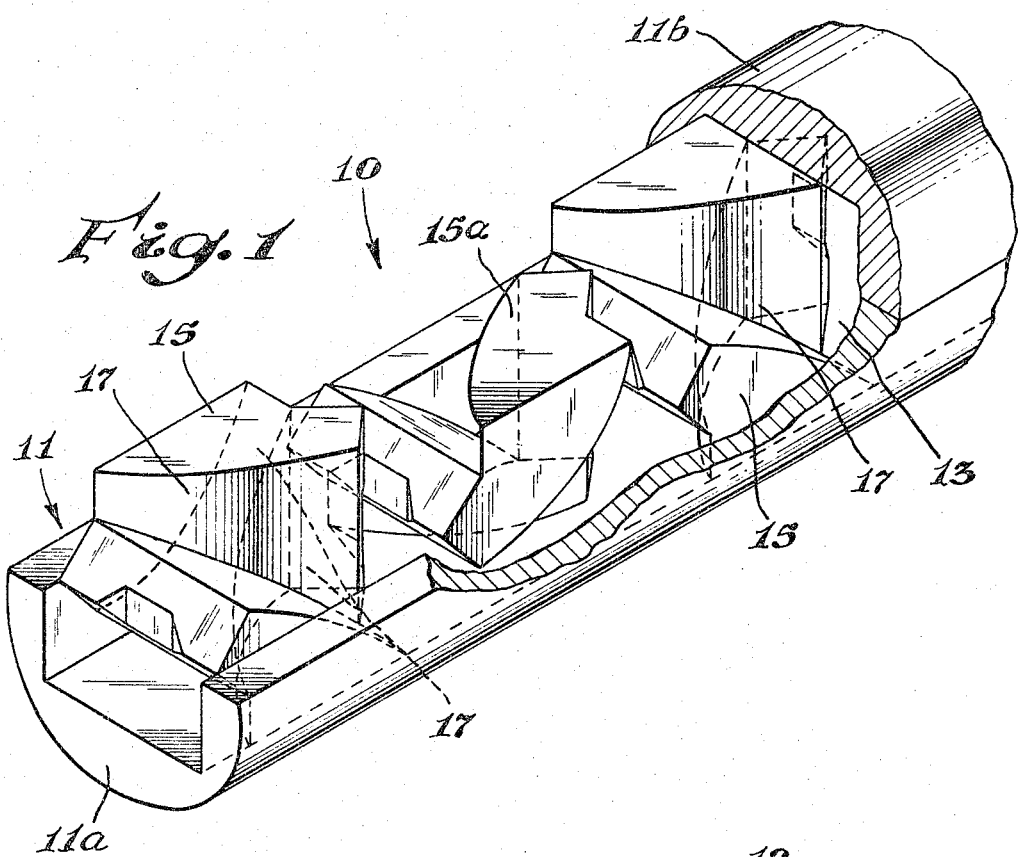
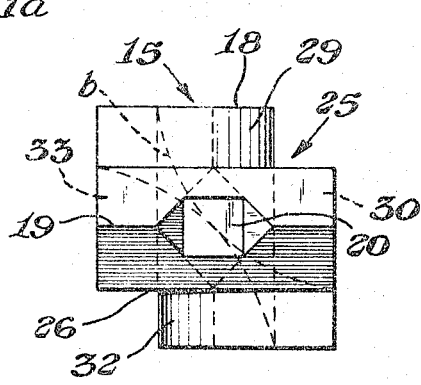
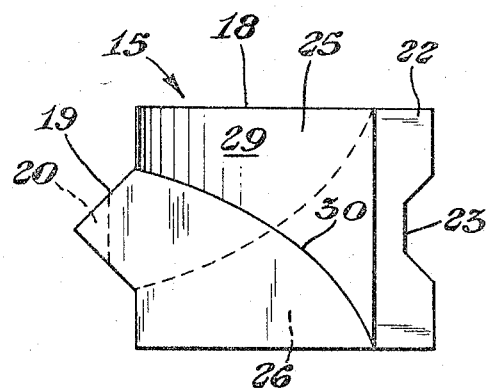
INVENTOR.
Douglas S. Chisholm
BY
AGENT
ATTORNEY INVENTOR.
Douglas S. Chisholm

3,328,003
METHOD AND APPARATUS FOR THE GENERATION OF A PLURALITY OF LAYERS IN A FLOWING STREAM
Douglas S. Chisholm, Midland, Mich., assignor to The Dow Chemical Company, Midland, Mich., a corporation of Delaware
Filed Feb. 9, 1965, Ser. No. 431,277
3 Claims. (Cl. 259—4)

This invention relates to a method and apparatus for the generation of layers in a flowing stream. It more particularly relates to an apparatus which generates a plurality of layers in a flowing stream with a minimum of mechanical distortion of the layers.

Mixing apparatus is known which is capable of generating a plurality of layers in a flowing stream with the ultimate goal of obtaining a substantially homogeneous mixture from the stream. Such apparatus, if judiciously employed, is capable of providing a stream of viscous materials such as heat plastified thermoplastic resins which comprise a plurality of generally parallel layers. If streamline flow of such a stream is maintained the resultant product may be shaped by means of a suitable die expressing device to form a solid body having a plurality of layers. It is desirable in such a body usually to maintain the layers in a relatively precise relationship whether such a body is a thin film or a sheet which exhibits a plurality of stripes.

Apparatus such as that disclosed in United States Letters Patent 3,051,453, is utilized for the generation of a plurality of layers; however, the geometry of the resultant product is not as uniform as desired. A similar apparatus embodying essentially a plurality of the flow diverters or baffles disclosed in United States Letters Patent 3,051,453 is illustrated in United States Letters Patent 3,051,452. The device of the 3,051,452 patent essentially comprises a plurality of baffles of the 3,051,453 patent disposed in side by side relationship and arranged in an annular configuration. In one case a generally rectangular stream is produced having a plurality of layers generally parallel to two of the faces of the rectangular stream. The annular embodiment provides an annular stream having a plurality of generally concentric layers. The annular stream, of course, may be reduced to a cylindrical stream by the expedient of decreasing the diameter of the central member to zero.

It is an object of this invention to provide an improved apparatus for the preparation of layered streams.

Another object of the invention is to provide an apparatus which provides layered streams having improved uniformity of the layers.

A further object of this invention is to provide an improved baffle adapted to be disposed in a rectangular conduit for the generation of layered streams.

These benefits and other advantages in accordance with the present invention are achieved by, in a process for mixing at least two streams of flowing materials comprising the steps of combining the streams into a single main stream, dividing the main stream into a plurality of partial streams, each having major and minor axes in cross section, and displacing at least one partial stream with respect to an adjacent partial stream while altering the cross sectional shape so as to reverse the major and minor axes thereof, and recombining the substreams the improvement which comprises maintaining the cross sectional area of the partial streams constant.

Also contemplated within the scope of the present invention is, in an apparatus comprising a conduit for supplying a main stream of material to be converted into a layered stream, means within the conduit for dividing the main stream into first and second branch streams, means within the conduit for simultaneously subdividing the first branch stream into a first and a second sub-branch stream, and the second branch stream into third and fourth sub-branch streams, means within the conduit for directly combining the first sub-branch stream with the third sub-branch stream and the second sub-branch stream with the fourth sub-branch stream, thereby producing modified first and second branch streams and means for combining the first and second modified branch streams into a modified main stream, the improvement which comprises that the means are so constructed and arranged as to maintain a constant cross sectional area of each of the branch streams within the conduit during the steps of dividing, displacing and recombining.

Further features and advantages of the present invention will become more apparent from the following specification when taken in connection with the drawing wherein:

FIGURE 1 is a cutaway view of a layered stream producing conduit in accordance with the invention;

FIGURE 2 is an end view of a stream diverter of FIGURE 1;

FIGURES 3, 4, 5 and 6 are side views of the baffle of FIGURE 2;

Figure 4:
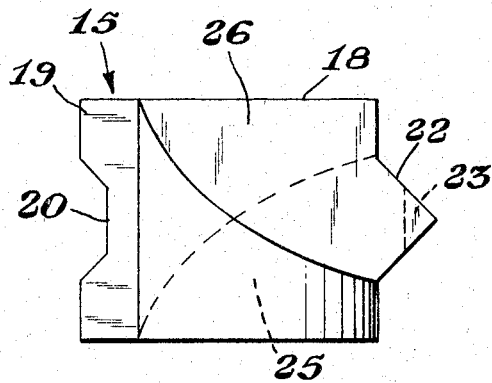

In FIGURE 1 there is illustrated an apparatus generally in accordance with the invention designated by the reference numeral 10. The apparatus 10 comprises in cooperative combination a conduit 11. The conduit 11 comprises a housing half 11a and a housing half 11b. The housing portions 11a and 11b define a passageway 13. A plurality of stream dividing means 15 are disposed within the conduit 11. Intermediate between the dividing means 15 are disposed dividing means 15a. The stream dividing means 15 and 15a have mirror image relationship to each other or are arbitrarily designated as right and left hand dividing means or baffles. The stream dividing means 15 in cooperative combination with the housing 11 define a plurality of passageways 17 having a constant cross sectional area. The apparatus of FIGURE 1 operates substantially in the manner as described in United States Patent 3,051,453 with the exception that the stream dividing means 15 and 15a in cooperation with the housing 11 permits the branch streams and the sub-branch streams to maintain a constant cross sectional area.

FIGURES 2–8 depict views of the stream dividing means or baffle 15. FIGURE 2 is the left elevation, FIGURE 3 the front elevation, FIGURE 4 is a rear elevation, FIGURE 5 a plan view, FIGURE 6 an inverted plan view, FIGURE 7 a right elevation and FIGURE 8 an isometric view. The baffle 15 comprises a body 18. The body 18 has a leading edge or stream dividing means 19. The stream dividing means 19 defines a baffle engaging recess 20. The body 18 has a stream dividing means or trailing edge 22 defining a baffle engaging recess 23. The body 18 defines a pair of generally opposed longitudinal grooves or passageways 25 and 26. The longitudinal groove 25 is defined by the surfaces 29 and 30 of the body 18. The longitudinal groove 26 is defined by the surfaces 32 and 33. The curvature of the surfaces 29, 30, 32 and 33 is such that the baffle 15 in cooperative combination with a rectangular conduit forms passageways of constant cross sectional area.

Figure 9:
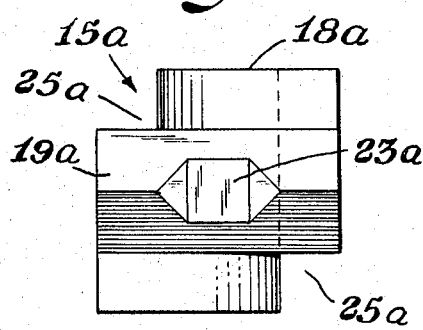
FIGURE 9 is an end view of a baffle of opposite hand to that of FIGURES 2–8.

FIGURE 9 is a left elevation of the baffle 15a of FIGURE 1. The baffle 15a is of opposite hand to the baffle 15.

The baffle 15 as illustrated in the accompanying drawing is a body having defined therein two channels of generally identical configuration. The baffle 15 is derived from a cube and is adapted to cooperate with a conduit having a square cross section so that the baffle in cooperation with the interior walls of the square conduit defines passageways having a substantially constant cross sectional configuration in the areas wherein the branch streams change the dimensions of their axes. The dotted line designated as $b$ in FIGURE 2 indicates the intersection of the two curved surfaces forming the channel or groove 26. The remaining or lower curved dotted line is the intersection of the surfaces forming the groove 25. The curvature of both lines is identical and the lower line is obtained by rotating the line $b$ in the plane of the paper 180 degrees. Thus the curve $b$ is the projection of the intersection of the curved surfaces defining the channel 26 on the face of a cube having an edge dimension about equal to a side of the edge of the cross sectional configuration of the passage in which it is to be disposed.

The curve $b$ is a plot of the equation $xy=1$ in rectangular coordinates wherein the geometric center of the face of the cube in an end view is located at $y=1$ and $x=1$.

Figure 5:
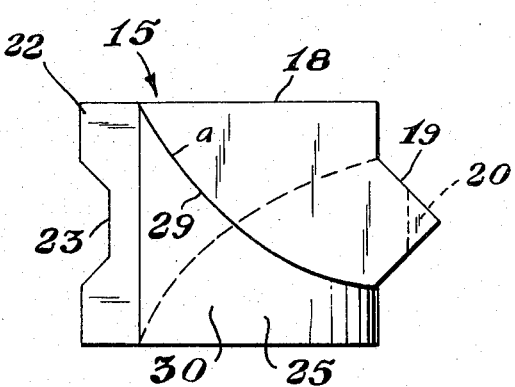
Figure 6:
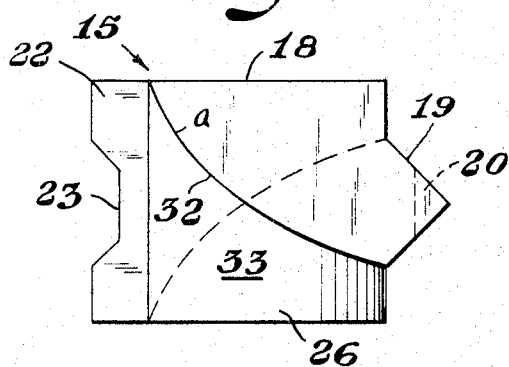
Figure 7:
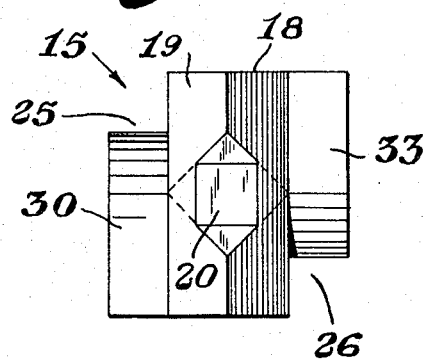
FIGURE 7 is an end view of the baffle of FIGURE 2 viewed from a direction 180° from the direction of the view of FIGURE 2.
Figure 8:
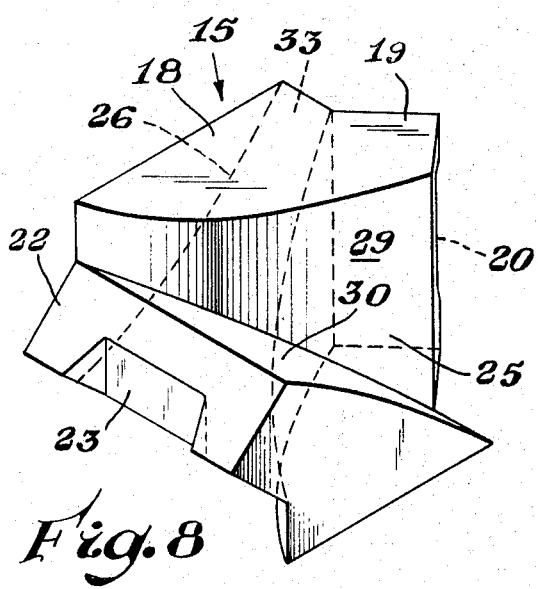
FIGURE 8 is an isometric view of the baffle of FIGURE 2.

In FIGURES 5 and 6 the solid curve $a$ is generated from the equation $y=\frac{1}{2}x$ (wherein the baffle is being generated from a cube having an edge length of unity) as plotted in rectangular coordinates wherein the $x$ direction is parallel to the axis of the conduit and the geometric center of a side projection of the baffle is at $x=0$ and $y=H$. The curve $a$ is a projection of the intersection of the two surfaces forming the channel on the face of a cube and is the configuration of the edge of the channel or groove in the baffle which is positioned adjacent the wall of a conduit having a square cross sectional configuration. The dotted curve has an identical curvature to that of the curve $a$ in FIGURES 5 and 6 but is rotated 180 degrees about a horizontal axis lying in the plane of the paper. The terminal portions of the baffle or trailing and leading edges 19 and 22 are then added to the cube to provide a transition into the next baffle and maintain streamline flow. The general case is such a baffle with the limitations that the cross section of the conduit be derived from a projected rectangular form having the length $l$, a width $w$ and a height $h$. A curve corresponding to the curve $a$ is a plot of the equation $h=(k/2)\frac{1}{l}$, and the curve equivalent to the curve $b$ is obtained by plotting $wh=k$. Curve $a$ on rectangular coordinates has its center at $l/2$ and $h/2$. Thus any desired configuration of baffle is readily derived for a particular configuration of rectangular conduit. Multilayer streams of viscous materials, when passed through a mixing conduit as herein described provide an important improved uniformity of lamina over the lamina obtained from the mixing apparatus of United States Letters Patent 3,051,452 and 3,051,453.

As is apparent from the foregoing specification, the apparatus of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

I claim:

1. In a process for mixing at least two streams of flowing materials comprising the steps of combining the streams into a single main stream, dividing the main stream into a plurality of partial streams, each having major and minor axes in cross section, and displacing at least one partial stream with respect to an adjacent partial stream while altering the cross sectional shape so as to reverse the major and minor axes thereof, and recombining the partial streams, the improvement which comprises maintaining the cross sectional area of each of the partial streams constant during displacement and alteration of cross sectional shape.

2. The method of claim 1 including the step of maintaining the partial streams in a generally rectangular cross sectional configuration.

3. In an apparatus comprising a conduit for supplying a main stream of material to be converted into a layered stream, means within the conduit for dividing the main stream into first and second branch streams, means within the conduit for simultaneously subdividing the first branch stream into a first and a second sub-branch stream, and the second branch stream into third and fourth sub-branch streams, means within the conduit for directly combining the first sub-branch stream with the third sub-branch stream and the second sub-branch stream with the fourth sub-branch stream, thereby producing modified first and second branch streams and means for combining the first and second modified branch streams into a modified main stream, the improvement which comprises that the means and conduit define a plurality of channels arranged so as to maintain a substantially constant cross sectional area of each of the branch streams within the conduit along the major axis of the conduit.

References Cited
UNITED STATES PATENTS

| 3,051,453 | 8/1962 | Sluijters | 259—4 |
| 3,239,197 | 3/1966 | Tollar | 259—4 |

WALTER A. SCHEEL, *Primary Examiner.*

J. M. BELL, *Assistant Examiner.*